(12) United States Patent
Nikain et al.

(10) Patent No.: US 11,108,652 B2
(45) Date of Patent: Aug. 31, 2021

(54) SERVER ASSISTED NETWORK DISCOVERY (SAND)

(71) Applicant: AT&T Intellectual Property I, L.P., Atlanta, GA (US)

(72) Inventors: Ali Nikain, Atlanta, GA (US); Mohammad Nikain, Atlanta, GA (US); Shahriar Ziari, Norcross, GA (US); Daniel Connolly, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 15 days.

(21) Appl. No.: 16/224,357

(22) Filed: Dec. 18, 2018

(65) Prior Publication Data
US 2020/0195523 A1    Jun. 18, 2020

(51) Int. Cl.
*H04L 12/24* (2006.01)
*H04L 12/46* (2006.01)
*H04L 29/08* (2006.01)

(52) U.S. Cl.
CPC ...... *H04L 41/5041* (2013.01); *H04L 12/4633* (2013.01); *H04L 12/4641* (2013.01); *H04L 41/0672* (2013.01); *H04L 41/12* (2013.01); *H04L 41/5032* (2013.01); *H04L 41/5058* (2013.01); *H04L 67/32* (2013.01)

(58) Field of Classification Search
None
See application file for complete search history.

(56) References Cited

U.S. PATENT DOCUMENTS

| | | | |
|---|---|---|---|
| 9,680,588 B2 | 6/2017 | Connolly et al. | |
| 9,781,004 B2 | 10/2017 | Danait et al. | |
| 9,876,757 B2 | 1/2018 | Mitchell et al. | |
| 9,979,595 B2 | 5/2018 | Choudhury et al. | |
| 9,992,108 B2 | 6/2018 | Hari et al. | |
| 2003/0177221 A1* | 9/2003 | Ould-Brahim | H04L 12/4641 709/223 |
| 2005/0237969 A1* | 10/2005 | Jung | H04W 76/12 370/328 |
| 2008/0186962 A1* | 8/2008 | Sinha | H04L 12/185 370/389 |
| 2014/0293778 A1* | 10/2014 | Fernandez-Palacios Gimenez | H04L 45/302 370/230 |
| 2014/0310512 A1* | 10/2014 | Sau | H04W 76/10 713/151 |
| 2016/0205518 A1* | 7/2016 | Patel | H04L 67/1002 455/518 |
| 2016/0373310 A1 | 12/2016 | Banikazemi et al. | |
| 2017/0279722 A1* | 9/2017 | Amulothu | H04L 47/125 |
| 2017/0366444 A1 | 12/2017 | Ansari et al. | |
| 2018/0006935 A1 | 1/2018 | Mutnuru et al. | |
| 2018/0062930 A1 | 3/2018 | Dhesikan et al. | |
| 2018/0152519 A1 | 5/2018 | Agarwal et al. | |

* cited by examiner

*Primary Examiner* — Scott B Christensen
(74) *Attorney, Agent, or Firm* — BakerHostetler

(57) ABSTRACT

Systems or methods that may be used to assist in distributed flow whereby each network element obtains information from a server so a first network element has information to determine what network element to connect with to create virtual private network tunnels associated with a virtual private network service.

13 Claims, 8 Drawing Sheets

US 11,108,652 B2

SERVER ASSISTED NETWORK DISCOVERY (SAND)

BACKGROUND

Carrier enterprise services (e.g. VPN) historically have been implemented using complex workflows and "designed" circuits where the network resources are specifically assigned to a client application.

SUMMARY

Disclosed herein are systems or methods that may be used to assist in distributed flow whereby each network element obtains information from a server that assists in network discovery. A first network element (e.g., the server) has information that helps determine the second network element (e.g., a provider edge) to connect with to create a VPN tunnel. This may be particularly useful with VPN services.

In an example, a device may include a processor and a memory coupled with the processor that effectuates operations. The operations may include obtaining, from a first network element, a request for a service, the request comprises first information; determining that the service can be performed by a second network element of a plurality of network elements; and based on determining that the service can be performed by the second network element, providing instructions to at least the first network element, wherein the instructions comprise creating a virtual private network tunnel between the first network element and the second network element based on the first information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Service provider's enterprise services (e.g., VPN services) historically have been implemented using complex workflows and "designed" circuits where the network resources are specifically assigned to a client application. These services involve a number of segment (IP Tunnels, VLANs, MPLS circuits, etc.). For any segments, the connections have to be setup by Telco operations support systems (OSS) in a centralized manner. Conventionally the segments lack discovery and on-demand setup support in the underlying protocols. The "static" and "end-to-end" nature of this design result in a complex operation which may be difficult to implement, change, and evolve. Any change in configuration may require another end-to-end design and failover/recovery is limited to what is planned in the original design. In addition, changes to service features may require updates to complex workflows (e.g., 60 or more steps in several sequential flows). Move, add, change, and disconnects (MACDs) may be very complex and cumbersome for service providers. Disclosed herein are systems or methods that may be used to assist in distributed flow whereby each network element obtains information from SAND so a first network element has information to determine what network element to connect with to create the VPN tunnel. This may be particularly useful with VPN services.

Figure 1:
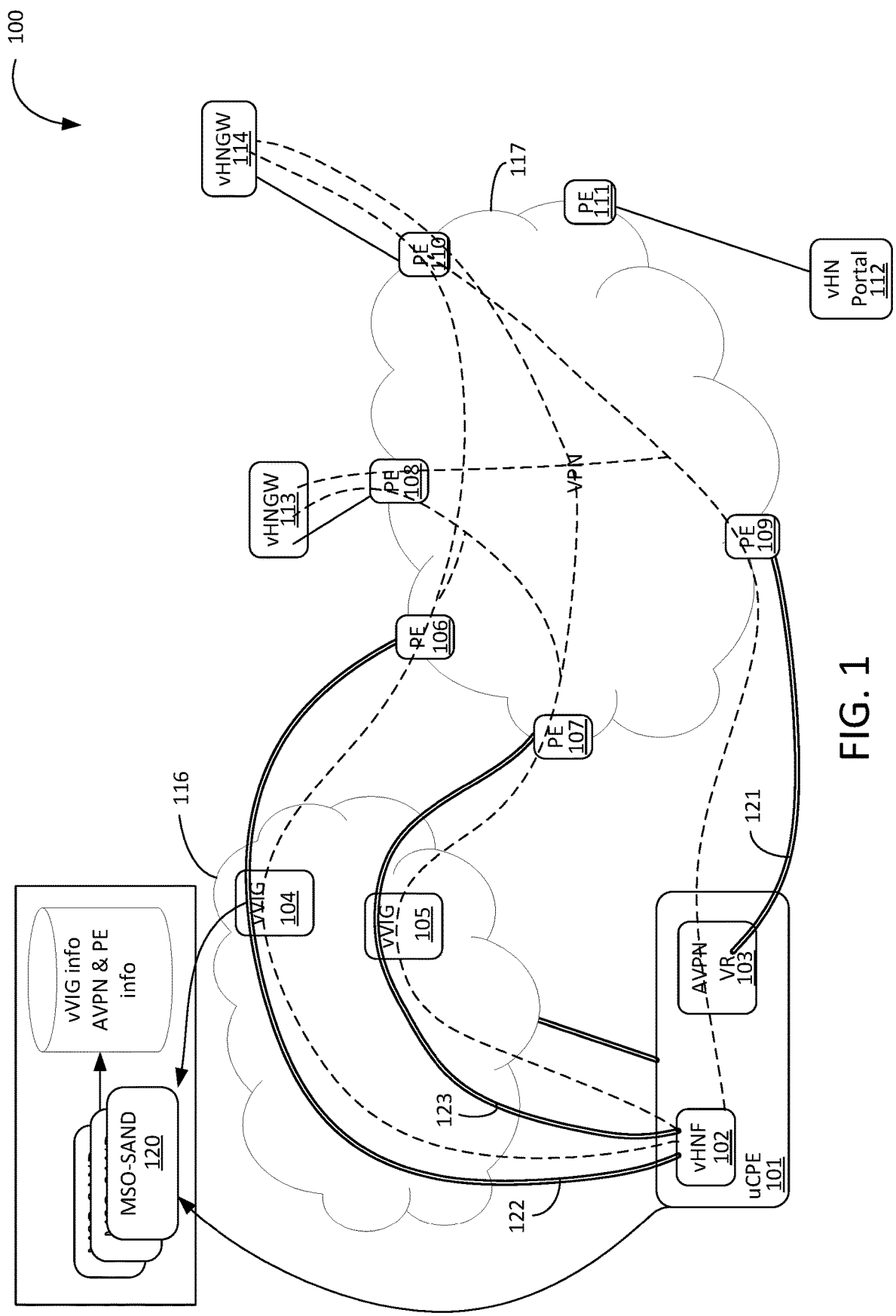
FIG. 1 illustrates an exemplary system for server assisted network discovery (SAND).

FIG. 1 illustrates an exemplary system 100 for server assisted network discovery (SAND). System 100 includes a service that allows user customer premise equipment (uCPE) 101 at a first site to connect with virtual network functions (VNF) through a virtual private network 117 of a service provider more efficiently. System 100 includes Internet 116, virtual private network 117, and SAND devices 120 that may assist VNFs discover and connect themselves. These intelligent VNFs may utilize SAND devices 120 to configure network paths for VNFs. uCPEs may replace routers and corresponding routing functions may be done by the VNFs. This provides better scalability. SAND devices 120 may be master service orchestrators that obtain and appropriately provide virtual VPN interface gateway (VVIG) information (e.g., information associated with vVIG 104 or vVIG 105). VNF's may include vHNGWs, vHNFs, or HN portals, among other things.

As shown, there may be an Ethernet connection 121 or an internet-based connection (e.g., connection 122 or connection 123) from uCPE 101. For the Ethernet connection, vHNF 102 of uCPE 101 (which includes VPN VR 103) connects with provider edge (PE) 109 of VPN 117. VPN 117 may include multiple PEs (e.g., PE 106-PE 111), multiple virtual hybrid networking gateways (vHNGW) (e.g., vHNGW 113 or vHNGW 114), or virtual hybrid network (vHN) portals (e.g., vHN portal 112). The devices or functions of system 100 may be communicatively connected with each other. The PE may be a physical edge device that aggregates traffic into the AVPN network. vHN Portal may be a GUI provided to customers to view stats on their network. The VHNGW may provide gateway VNF functionality between FIN Portal and vHNF.

FIG. 2-FIG. 6 illustrate methods associated with SAND. A SAND device may be used to assist in distributed flow whereby each network element obtains information from SAND so a first network element has information to determine what network element to connect with to create the VPN tunnel, for example. The information may be authentication information for creating the VPN tunnel. Network elements may be devices in FIG. 1 (e.g., vVIG, PE, etc.).

Figure 2:
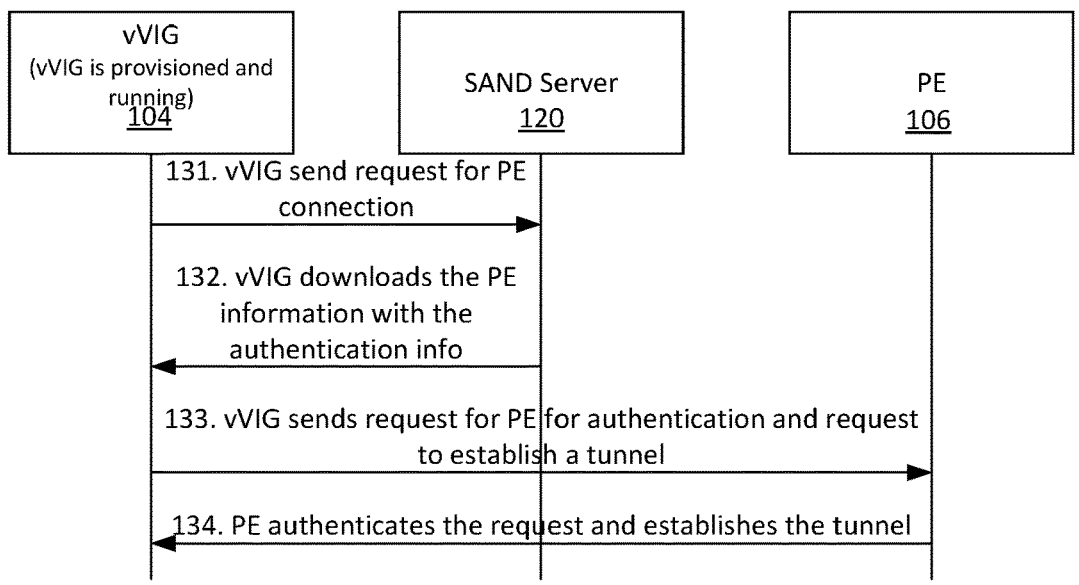
FIG. 2 illustrates an exemplary vVIG method associated with SAND for triggering a request to create a tunnel to a PE.

FIG. 2 illustrates an exemplary vVIG method associated with SAND for triggering a request to create a tunnel to a PE. The creation of a VPN tunnel (e.g., FIG. 3) may trigger step 131. At step 131, vVIG 104 may send a request for a connection with a PE to SAND device 120. At step 132, in response to the request of step 131, vVIG 104 may obtain (e.g., download) PE information which may include authentication information for vVIG 104 to subsequently use to authenticate with one or more PEs. A tunnel may span one or multiple PEs. The PE information that may be obtained may be info such as IP addresses of nearby or otherwise capable PEs, utilization of nearby PEs, optimal path information, certification information, authentication, etc. vVIG 104 may reach out to SAND device 120 to determine which PE to connect with. At step 133, based on the information obtained at step 133, vVIG 104 may send a request to PE 106 to authenticate and request to establish a VPN tunnel. The request may include the IP address of the destination (e.g., vHNGW 114), interface or other status of vVIG 104 (e.g., utilization, in-use, operational or not, up-time statistics over a period (e.g., 1 week), etc.).

At step 134, based on the information of the request at step 133, PE 106 may authenticate the request. The tunnel may be established after the authentications or queries are completed between uCPE/vVIG/PE and SAND. It is contemplated herein that a complete VPN tunnel segment may have multiple sub-segments. As discussed in more detail herein, sub-segments may be created in an iterative process to create a complete VPN tunnel segment (e.g., segments of a VPN tunnel) between uCPE 101 and vHNGW 114. For example, sub-segments of uCPE 101 to vVIG 104, vVIG 104 to PE 106, PE 106 to PE 110, etc.

Figure 3:
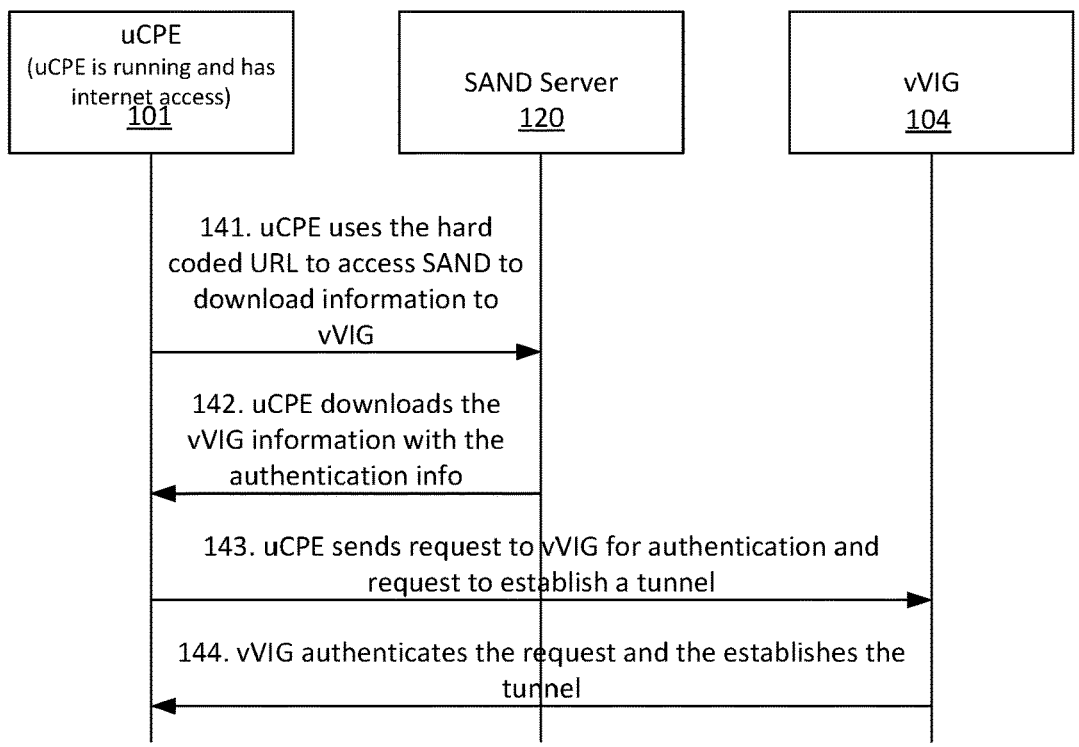
FIG. 3 illustrates an exemplary uCPE method associated with SAND for triggering a request to create a tunnel to a vVIG.

FIG. 3 illustrates an exemplary uCPE method associated with SAND for triggering a request to create a tunnel to a vVIG. Initial installation of the uCPE at the customer premises (e.g., power on of uCPE at a location determined by GPS) may trigger step 141. At step 141, uCPE 101 may use a hard-coded Uniform Resource Locator (URL) to access SAND device 120 to obtain vVIG information. There may be one or more VVIGs. uCPE 101 may point to the aforementioned URL to obtain a more detailed configuration, since uCPE 101 may initially have minimal configuration. The link to the SAND service (e.g., SAND device 120) may be hard coded as part of vendor setup (e.g., shipped from vendor with URL coded). uCPE 101 may be on customer premise, powered up and have access to Internet 116 before occurrence of step 141. vVIG information that may be obtained may be info such as IP addresses of nearby vVIGs or PEs connected with PE, utilization of vVIGs (e.g., CPU or interface), optimal path to destination address, certification info, authentication, etc. At step 142, based on the request of step 141, uCPE 101 may obtain the vVIG information that may include authentication information for the vVIG. At step 143, based on the obtained information of step 142, uCPE 101 may send a request to vVIG for authentication and request to establish a VPN tunnel. At step 144, based on the request of step 143, vVIG 104 may authenticate and establish a VPN tunnel segment (e.g., sub-segment) with uCPE 101. It is contemplated herein that a complete VPN tunnel segment may have multiple sub-segments.

Figure 4:
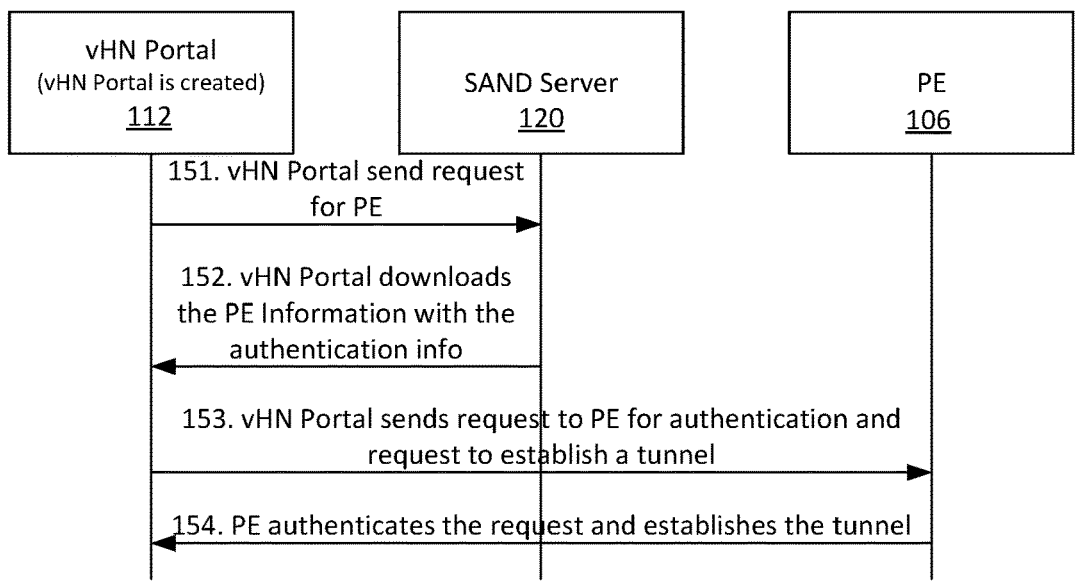
FIG. 4 illustrates an exemplary vHN portal method associated with SAND for triggering a request to create a tunnel to a PE.

FIG. 4 illustrates an exemplary vHN portal method associated with SAND for triggering a request to create a tunnel to a PE. Establishing connectivity to PE 106 (or vHNGW 114), for example, may trigger step 151 to occur. At step 151, vHN portal 112 may send a request SAND device 120 to obtain PE information. There may be multiple PEs. PE information that may be obtained may be info such as IP addresses, utilization, optimal path, certification info, authentication, etc. At step 152, based on the request of step 151, vHN portal 112 may obtain the PE information that may include authentication information for the PE. At step 153, based on the obtained information of step 152, vHN portal 112 may send a request to PE 106 for authentication and request to establish a VPN tunnel. At step 154, based on the request of step 153, PE 106 may authenticate and establish a VPN tunnel segment (e.g., sub-segment) with vHN portal 112. It is contemplated herein that a complete VPN tunnel segment may have multiple sub-segments.

Figure 5:
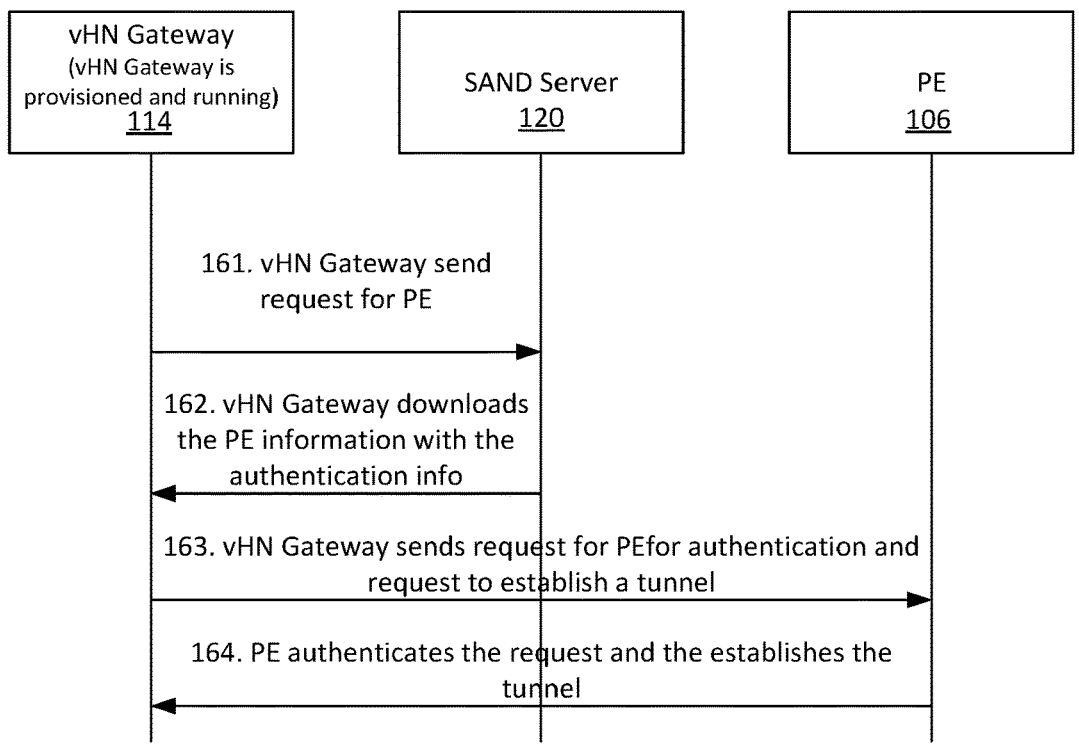
FIG. 5 illustrates an exemplary vHN gateway method associated with SAND for triggering a request to create a tunnel to a PE.

FIG. 5 illustrates an exemplary vHN gateway method associated with SAND for triggering a request to create a tunnel to a PE. Step 161 may be triggered, for example, based on receiving an indication of detecting connectivity establishment to vHNGW. At step 161, vHN gateway 114 may send a request to SAND device 120 to obtain PE information. At step 162, based on the request of step 161, vHN gateway 114 may obtain the PE information that may include authentication information for the PE. At step 163, based on the obtained information of step 162, vHN gateway 114 may send a request to PE 106 for authentication and request to establish a VPN tunnel. At step 164, based on the request of step 163, PE 106 may authenticate and establish a VPN tunnel segment (e.g., sub-segment) along a path to vHN gateway 114. It is contemplated herein that a complete VPN tunnel segment may have multiple sub-segments.

Figure 6:
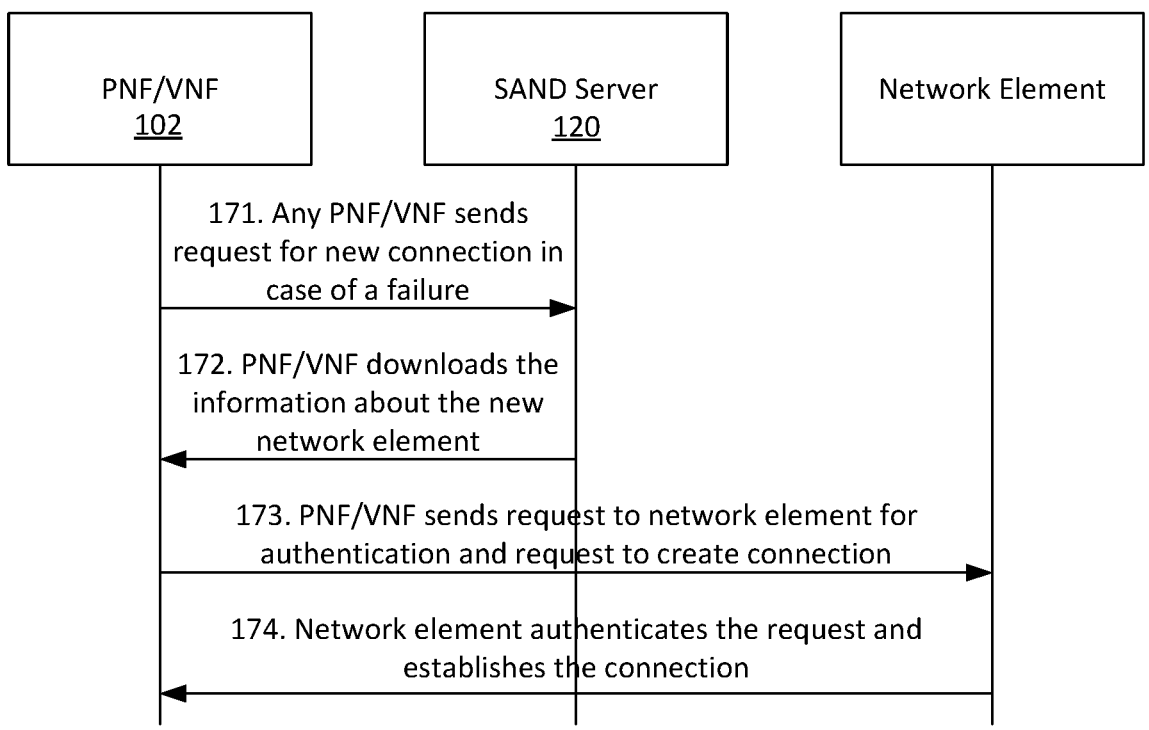
FIG. 6 illustrates an exemplary method associated with using SAND for connections affected by a failure.

FIG. 6 illustrates an exemplary method associated with using SAND for connections affected by a failure. At step 171, any PNF/VNF (e.g., vHNF 102) may send a request for new connection (e.g., network element information) based on a failure of a connection (e.g., vHNF 102 to vVIG 104 of FIG. 1). Network element information may be info such as IP addresses of available connections, utilization (e.g., processor or interfaces), optimal path, certification, authentication, etc. This request may be a general request for operation network element that restores the previous VPN tunnel and not necessarily for a particular network element. At step 172, vHNF 102 may obtain network element information (e.g., vVIG 105) as requested in step 171 from SAND device 120. At step 173, based on the obtained information of step 172, vHNF 102 may send a request to network element (e.g., vVIG 105) for authentication and request to establish a VPN tunnel. At step 174, based on the request of step 173, vVIG 105 may authenticate and establish a VPN tunnel segment (e.g., sub-segment) with vHNF 102. The recreation of the end-to-end path in view of the failure may establish a completely different end-to-end path than the path before the failure. One reason may be to circumvent failed links or change to a path with increased performance (e.g., increased bandwidth, minimal CPU usage for devices along the path, or minimal errors associated with a device along the path, among other things along a path that may lead to faster response times). When a SAND server receives a request (e.g., step 171) it may analyze information associated with bandwidth of interface, central processing unit (CPU) utilization, utilization of interface during a period (e.g., last week), uptime of interfaces, round-trip times across a link or links along a proposed path, among other information (e.g., PE information, vVIG information, network element information, as discussed herein). Different thresholds (e.g., minimum or maximum thresholds of CPU utilization) may be obtained associated with the service or customer and used for analysis. Based on the analysis, the SAND server may suggest a device to use along the path of a tunnel segment. It is contemplated herein that a complete tunnel segment (e.g., VPN tunnel) may have multiple sub-segments.

The disclosed SAND service may allow services to be offered more quickly. Given this optimization in the network, services (which may ride on top of the network) may be offered more efficiently. Examples of services may be Internet, virtual private networks, etc. In conventional system, such services were implemented using complex OSS functions and centralized coordination and orchestration. The complexity of these functions may grow exponentially since interactions between the various parts can significantly increase. The disclosed SAND service may provide a distributed system that may keep updates simpler (in the order of n as opposed to n^2 since different parts are independent of each other, and updates to one part may not cascade throughout the OSS infrastructure). Fault management and exception handling may be more efficient (e.g., quicker or automated installation). The conventional implementations of each type of fault, reconfiguration, fall out, etc. have to be individually modeled, implemented in OSS, etc. For the SAND service as disclosed herein, each segment may be automatically setup by its end-points and follow discovery and automatic setup if any changes are made (e.g. if a node is removed, another path may be automatically found).

Figure 7:
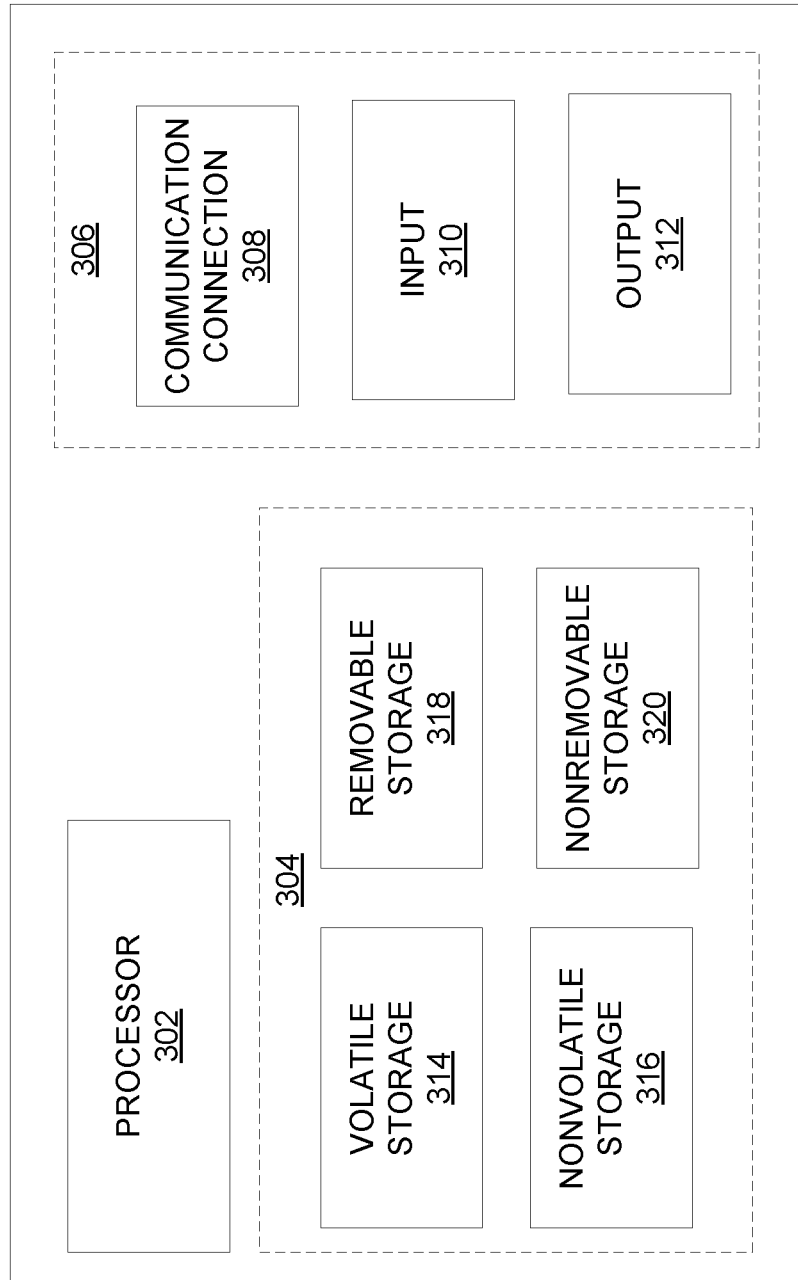
FIG. 7 illustrates a schematic of an exemplary network device.

FIG. 7 is a block diagram of network device 300 that may be connected to or comprise a component of system 100 (e.g., uCPE 101, vVIG 104, PE 107, vHNGW 113). Network device 300 may comprise hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 8:
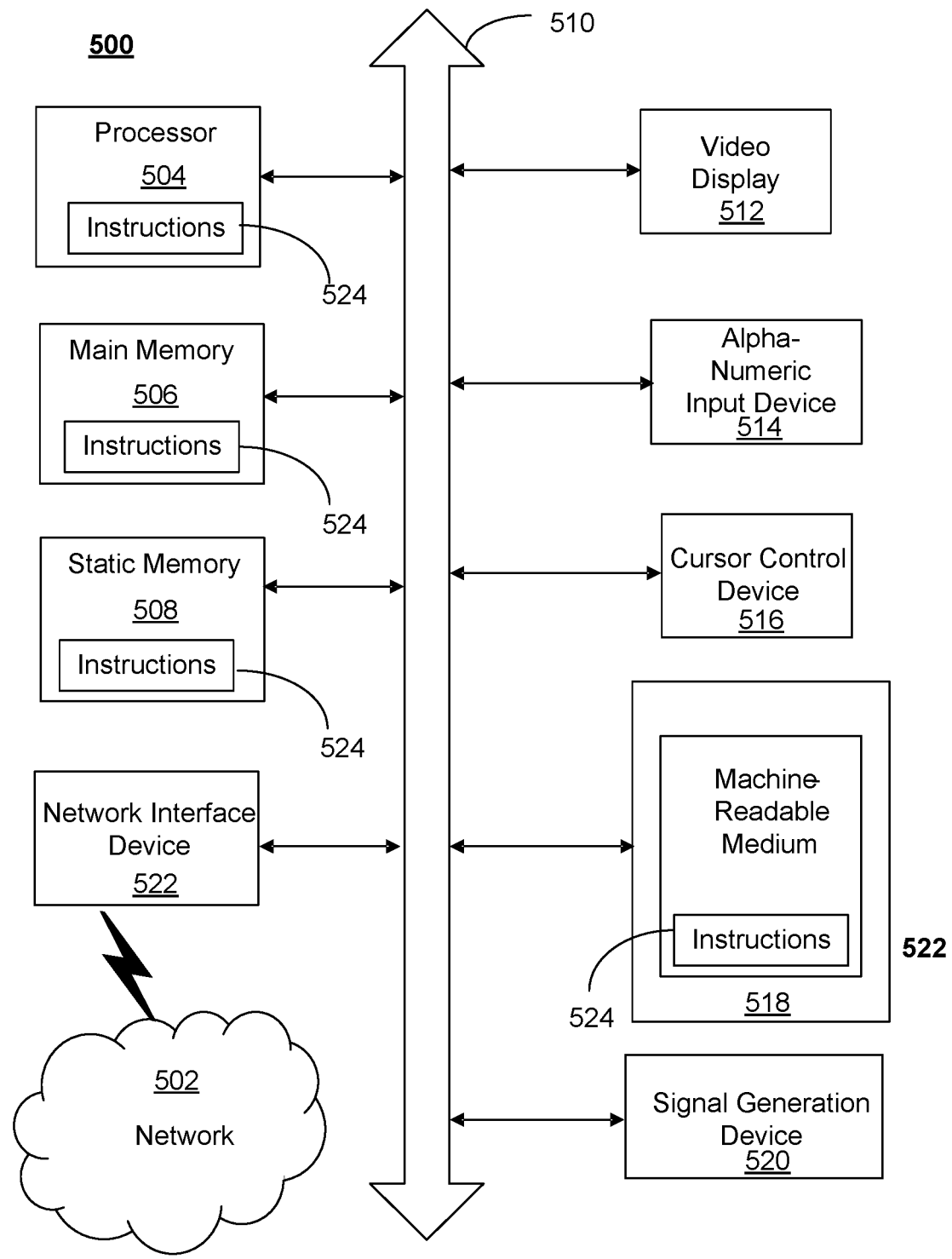
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, uCPE 101, vVIG 104, PE 106-PE 111, vHNGW 113, vHNGW 114, SAND device 120, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9A:
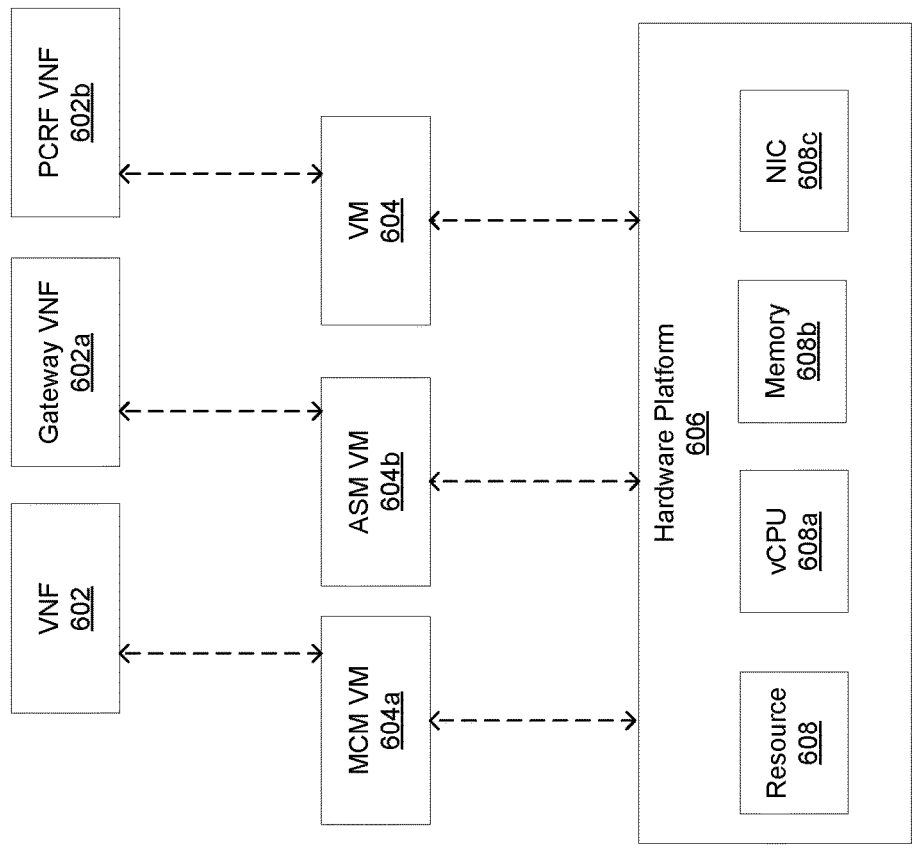
FIG. 9a is a representation of an exemplary network.

FIG. 9*a* is a representation of an exemplary network 600. Network 600 (e.g., VPN 117) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 9*a* illustrates a gateway VNF 602*a* and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 9*a* illustrates a management control module (MCM) VM 604*a*, an advanced services module (ASM) VM 604*b*, and a DEP VM 604*c*. Additionally or alternatively, VMs 604 may include other types of VMs. Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 9B:
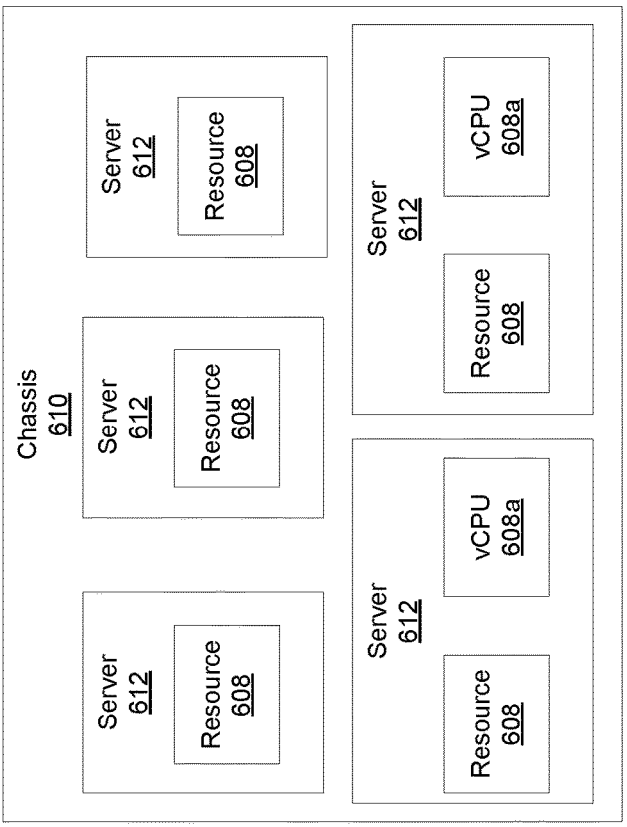
FIG. 9b is a representation of an exemplary hardware platform for a network.
Figure 9B:
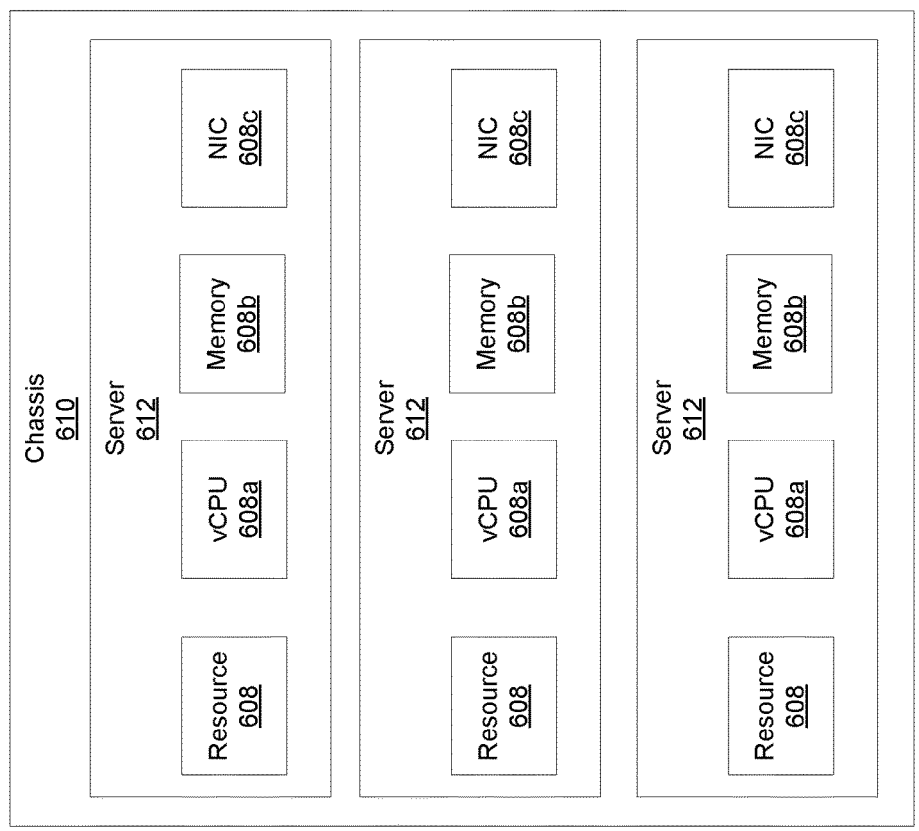

While FIG. 9*a* illustrates resources 608 as collectively contained in hardware platform 606, the configuration of hardware platform 606 may isolate, for example, certain memory 608*c* from other memory 608*c*. FIG. 9*b* provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 9*b* illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which SAND messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—SAND service—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, or devices may include instructions associated with obtaining, from a first network element, a request for a service, the request comprises first information associated with a private line (e.g., VPN) service; determining that the service can be performed by a second network element of a plurality of network elements; and based on determining that the service can be performed by the second network element, providing instructions to at least the first network element, wherein the instructions comprise creating a virtual private network tunnel between the first network element and the second network element based on the first or second information. The device may be a server for assisted network discovery of private line (e.g., VPN) services. The device may obtain network element information (e.g., PE information or vVIG information) to make the determinations. The operations my further comprise analyzing the request for the service to determine a bandwidth threshold associated with implementing the service; and selecting the second network element for a VPN connection with the first network element based on the analysis of the request or the second information for the service. The first information or second may include central processing unit utilization of the second network element. The instructions may include analyzing the request for the service to determine a bandwidth threshold associated with the service; and selecting the second network element for a VPN connection with the first network element based on the analysis of the request for the service. The instructions may be sent to the plurality of network elements along a path to create a VPN connection for a virtual network function, wherein the subset of the plurality of network elements along the path comprises the second network element. The instructions may be obtaining an alert that a sub-segment of the VPN connection has failed, wherein the alert is associated with a down connection condition of the second network element; and based on the alert, providing instructions to the first network element or a third network element to recreate the VPN connection for a virtual network function. Methods, systems, or devices may include instructions associated with obtaining, from a first network element, a request for a service, the request comprises first information associated with a private line (e.g., VPN) service; based on the request obtaining second information associated with a plurality of network elements; based on the second information or the request, determining that the service can be performed by a second network element of the plurality of network elements; and based on determining that the service can be performed by the second network element, providing instructions to at least the first network element, wherein the instructions comprise creating a virtual private network tunnel between the first network element and the second network element based on the first or the second information. It is contemplated that steps may be combined or skipped herein.

What is claimed:
1. A device comprising:
a processor; and a memory coupled with the processor, the memory comprising executable instructions that when executed by the processor cause the processor to effectuate operations comprising:
- receiving first information from a plurality of network elements, wherein the first information comprises bandwidth of interfaces, central processing unit (CPU) utilization, and utilization of interfaces, wherein the first information is obtained with use of a hard-coded uniform resource locator (URL) stored by the device;
- obtaining, from a first network element, a request for a virtual private network service along a path associated with one or more network elements of the plurality of network elements, wherein the first network element is a network function;
- responsive to the request, analyzing the first information associated with the plurality of network elements to determine whether the one or more network elements meet each of a plurality of thresholds within the request for the virtual private network service along the path associated with the one or more network elements of the plurality of network elements,
  - wherein the plurality of thresholds comprise a maximum central processing unit (CPU) utilization and utilization of an interface; and
  - wherein the plurality of network elements comprise a provider edge or a virtual private network gateway;
- in response to the analyzing, selecting a second network element of the plurality of network elements that meets the plurality of thresholds; and
- providing instructions to at least the first network element,
  - wherein the instructions cause the creation of a virtual private network tunnel between the first network element and the second network element.

2. The device of claim 1, wherein the network function is a virtual network function.

3. The device of claim 1, the operations further comprising:
- analyzing the request for the service to determine a bandwidth threshold associated with implementing the service; and
- selecting a third network element for the virtual private network tunnel, the selecting based on the analysis of the request for the service.

4. The device of claim 1, the operations further comprising:
- analyzing the request for the service to determine a bandwidth threshold associated with a tunnel sub-segment for the virtual private network tunnel; and
- selecting a third network element for the virtual private network tunnel, the selecting based on the analysis of the request for the service.

5. The device of claim 1, the operations further comprising:
- obtaining an alert that a sub-segment of the virtual private network tunnel has failed, wherein the alert is associated with a down connection condition of the second network element; and
- based on the alert, providing instructions to the first network element or a third network element to recreate the virtual private network tunnel for a virtual network function.

6. A method performed by a device, the method comprising:
- receiving first information from a plurality of network elements, wherein the first information comprises bandwidth of interfaces, central processing unit (CPU) utilization, and utilization of interfaces, wherein the first information is obtained with use of a hard-coded uniform resource locator (URL) stored by the device;
- obtaining from a first network element, a request for a new virtual private network service along a path associated with one or more network elements of the plurality of network elements, wherein the first network element is a network function;
- responsive to the request, analyzing the first information associated with the plurality of network elements to determine whether the one or more network elements meet each of a plurality of thresholds within the request for the new virtual private network service along the path associated with the one or more network elements of the plurality of network elements;
  - wherein the plurality of thresholds comprise a maximum central processing unit (CPU) utilization or utilization of an interface; and
  - wherein the plurality of network elements comprise a provider edge or a virtual private network gateway;
- in response to the analyzing, selecting a second network element of the plurality of network elements that meets the plurality of thresholds; and
- providing instructions to at least the first network element, wherein the instructions cause the creation of a new virtual private network tunnel between the first network element and the second network element.

7. The method of claim 6, further comprising:
- analyzing the request for the service to determine a bandwidth threshold associated with implementing the service; and
- selecting a third network element for the new virtual private network tunnel, the selecting based on the analysis of the request for the service.

8. The method of claim 6, further comprising:
- analyzing the request for the service to determine a bandwidth threshold associated with a tunnel sub-segment for the new virtual private network tunnel; and
- selecting a third network element for the new virtual private network tunnel, the selecting based on the analysis of the request for the service.

9. The method of claim 6, further comprising:
- obtaining an alert that a sub-segment of the VPN connection has failed, wherein the alert is associated with a down connection condition of the second network element; and
- based on the alert, providing instructions to the first network element or a third network element to recreate the VPN connection for a virtual network function.

10. A computer readable storage medium storing computer executable instructions that when executed by a computing device cause said computing device to effectuate operations comprising:
- receiving first information from a plurality of network elements, wherein the first information comprises bandwidth of interfaces, central processing unit (CPU) utilization, and utilization of interfaces, wherein the first information is obtained with use of a hard-coded uniform resource locator (URL) stored by the device;
- obtaining, from a first network element, a request for a virtual private network service along a path associated with one or more network elements of the plurality of network elements, wherein the first network element is a virtual network function;

responsive to the request, analyzing the first information associated with the plurality of network elements to determine whether the one or more network elements meet each of a plurality of thresholds within the request for the virtual private network service along the path associated with the one or more network elements of the plurality of network elements, wherein the each of a plurality of thresholds comprise a maximum central processing unit (CPU) utilization and utilization of an interface; and wherein the plurality of network elements comprise a provider edge or a virtual private network gateway;

in response to the analyzing, selecting a second network element of the plurality of network elements that meets the one or more thresholds; and providing instructions to at least the first network element, wherein the instructions cause the creation of a virtual private network tunnel between the first network element and the second network element.

11. The computer readable storage medium of claim 10, the operations further comprising:

analyzing the request for the service to determine a bandwidth threshold associated with implementing the service; and selecting a third network element for the virtual private network tunnel, the selecting based on the analysis of the request for the service.

12. The computer readable storage medium of claim 10, the operations further comprising:

analyzing the request for the service to determine a bandwidth threshold associated with a tunnel sub-segment for the virtual private network tunnel; and selecting a third network element for the virtual private network tunnel, the selecting based on the analysis of the request for the service.

13. The computer readable storage medium of claim 10, the operations further comprising:

obtaining an alert that a sub-segment of the virtual private network tunnel has failed, wherein the alert is associated with a down connection condition of the second network element; and based on the alert, providing instructions to the first network element or a third network element to recreate the virtual private network tunnel for a virtual network function.

* * * * *